US007133052B1

(12) United States Patent
Silva

(10) Patent No.: US 7,133,052 B1
(45) Date of Patent: Nov. 7, 2006

(54) MORPH MAP BASED SIMULATED REAL-TIME RENDERING

(75) Inventor: Bruno C. Silva, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 301 days.

(21) Appl. No.: 09/813,466

(22) Filed: Mar. 20, 2001

(51) Int. Cl.
*G09G 5/00* (2006.01)
(52) U.S. Cl. .................................... 345/646
(58) Field of Classification Search ............... 345/646, 345/426
See application file for complete search history.

(56) References Cited

U.S. PATENT DOCUMENTS

| | | | | |
|---|---|---|---|---|
| 5,613,048 | A * | 3/1997 | Chen et al. ............ | 345/419 |
| 6,226,005 | B1 * | 5/2001 | Laferriere ............. | 345/426 |
| 6,362,833 | B1 * | 3/2002 | Trika ................... | 345/646 |
| 6,366,282 | B1 * | 4/2002 | Trika ................... | 345/423 |
| 6,407,743 | B1 * | 6/2002 | Jones .................. | 345/582 |
| 6,525,725 | B1 * | 2/2003 | Deering ................ | 345/419 |
| 6,556,196 | B1 * | 4/2003 | Blanz et al. ........... | 345/419 |

OTHER PUBLICATIONS

Chen et al., View Interpolation for Image Synthesis, ACM, 1993, pp. 279-288.*

Blanz et al., A Morphable Model for the Synthesis of 3D Faces, 1999, ACM SIGGRAPH, pp. 187-194.*

* cited by examiner

*Primary Examiner*—Richard Hjerpe
*Assistant Examiner*—Motilewa Good-Johnson
(74) *Attorney, Agent, or Firm*—Ronald M. Anderson

(57) ABSTRACT

Efficient, real-time rendering of an output image is implemented using one or more input images and morph maps that include data defining characteristics of each pixel in the output image. The input images can include textures and other graphic data for a surface of an object. Any of a number of different known techniques are used to produce the data included in a morph map for rendering a scene. The morph map is implemented for a rectangular area M (x, y) and associates a set of $M_j(x, y)$ data with each pixel position in the rectangular area, where j is a positive integer providing an index to one of the sets of pixel data associated with a pixel position. A set of up to seven parameters are included in the $M_j(x, y)$ data for each pixel position. Using the morph map, a real-time rendering engine performs a transformation when the displayed scene must be modified in response to a user interaction or in response to some software program event. The real-time rendering engine combines the data in the morph maps and the different input images at a specific pixel position, producing an output value for the pixels that have changed. Only the changed pixels need to be recomputed and newly rendered in the output image. An indexing mechanism is used to minimize the computation load. Image morphing is accomplished by combining two warped images in a range, using either a constant blended value or a space-variant value.

36 Claims, 15 Drawing Sheets
(12 of 15 Drawing Sheet(s) Filed in Color)

212

230

MORPH MAP BASED SIMULATED REAL-TIME RENDERING

FIELD OF THE INVENTION

The present invention generally relates to rendering images for display in real time, and more specifically, to simulate real-time rendering of such images using one or more morph maps for the image that have previously been produced and which include data defining characteristics of pixels in the image.

BACKGROUND OF THE INVENTION

Powerful video display cards that have recently been developed for use on personal computers and workstations specifically designed for graphics computations are capable of rendering three-dimensional (3D) images on a display in real time. However, in regard to computer games and other applications, it is desirable to enable less powerful personal computers, other specialized computing devices (e.g., video game consoles), and personal computers that do not include such advanced 3D video display cards to render images in real time in response to user input and/or program generated events. For example, it may be desirable to render an image on a display in real time so that the image simulates the refraction that occurs as light passes through a "bumpy" glass layer, or to simulate the appearance of light reflected by a mirror surface into the image, or to map an image onto an arbitrary surface. A simulation of any of these optical effects should show highlights, shading, distortion, tint caused by the color of a glass or mirror, and reflections from the surface.

An initial need for a method that facilitates real-time rendering of an image on a typical personal computer not having the power of a graphics workstation arose in connection with two requirements. In the first requirement, it became necessary to enable a user to select a patch (i.e., a generally rectangular region) in an image applied to a 3D surface, and to enable a user to freely drag the patch over the 3D surface, so that the patch always appears to remain on the surface in the rendered image. This feature should be accomplished while maintaining an acceptable image quality and should achieve real-time performance. In the second requirement, it became necessary to simulate the appearance of an image distorted by light passing through a lump of glass as objects are moved behind the glass (relative to the viewer's position) by a user manipulating a mouse or other pointing device. Related problems requiring a solution include the use of a distorting mirror to modify the appearance of objects appearing in an image. It was recognized that any solution to these problems should also be able to handle combinations of these optical rendering problems.

A technique that addresses the problems noted above should be capable of simulating other real-time rendering effects. For example, there are many applications in which it would be desirable to simulate the rendering of classic morphing effects. The morphing process portrays the gradual change of an image of one object into an image of a different object. Furthermore, the simulated rendering of images should enable anti-aliasing to be carried out by properly blending the foreground of an object with its background along the edges of the object. While solutions to these problems exist in the prior art, they cannot be readily implemented without the use of a relatively powerful computer or by employing an advanced video graphics adapter. For example, real-time global illumination in an image undergoing changes can readily be achieved by using ray tracing in which the behavior of light rays in a rendered image is simulated by following the reverse path of each ray of light as it travels from a source to the observer. Although ray tracing provides high quality results, it is extremely computationally intensive and therefore, unacceptably slow if attempted on a typical home personal computer.

Certain techniques have been developed in the prior art to address the limitations of less powerful computers in implementing specific aspects of real-time rendering. One solution developed to deal with hidden surfaces when rendering an image is known as "z-buffering." However, z-buffering does not model global illumination effects, such as reflections, but instead accumulates, for each pixel position in an image, data for an object that is closest to the observer. Indeed, most techniques known in the prior art for rendering an image in real time are either too computationally intensive and thus too slow to implement, or produce artifacts, including incorrect highlights or polygonal silhouettes, leading to unacceptably low-quality rendering, or like the polygon-based 3D rendering approach based upon the z-buffering method, are incomplete solutions to the problem.

An early attempt to solve some of these problems was developed for use in PANDORA'S BOX™, a game created and marketed by Microsoft Corporation. In this game, only some of the problems noted above were solved. Real-time rendering was simulated in the game using a morph map that stores a set of data associated with each pixel position in an image. To avoid delays in rendering an image, the morph maps required in the game were produced in a pre-processing step using conventional rendering techniques. The morph maps thus produced were then included in the game software that was distributed to purchasers of the game. However, the prior art game software included only one set of morph data for each pixel position in a given output image and was incapable of classic morphing, or of implementing anti-aliasing, because it did not employ multiple input images, multiple sets of pixel data for each pixel location, or a blending (alpha) factor. Also, it could not produce colored modulation and highlights and was incapable of simulating full ray tracing functionality.

Accordingly, the prior art approach in this earlier product was simply a subset and was an incomplete solution to the problems noted above. The present invention was developed to address these deficiencies in this prior art.

SUMMARY OF THE INVENTION

In accord with the present invention, a method is defined for simulating a real-time rendering of a desired graphical effect in an image of an object on a display. The method includes the steps of precomputing data defining a behavior of light rays illuminating the object based on a plurality of input images. This step yields a plurality of morph maps in which at least one set of pixel-dependent data is associated with each pixel position. In response to either a user action or an event that indicates the desired graphical effect, the method then performs a transformation using the plurality of morph maps to produce an output image simulating the real-time rendering of the desired graphical effect in the display of the output image.

The step of precomputing preferably includes the step of producing data that include a blending factor. In addition, the step of precomputing also preferably includes the step of producing data that include an additive factor used to control saturation of the output image. In one preferred embodiment, the step of precomputing includes the step of tracing rays of light to determine the plurality of morph maps, based on a global illumination and a local illumination at each intersection with a surface by the rays of light.

The step of performing the transformation in one application of the method preferably includes the steps of producing a plurality of warped images from the plurality of morph maps and combining the plurality of warped images over a range, with a cross-dissolve. The iterative combination of the plurality of warped images produces successive output images in which an image of the object appears to morph between an initial state and a final state.

Alternatively, the step of performing the transformation comprises the step of mapping a selected portion of a surface of the object onto a different part of the object to simulate an effect corresponding to movement of the selected portion of the surface over the object. Preferably, only pixels of the object that have been altered are recomputed in the output image. In this case, the step of performing the transformation preferably includes the steps of providing a grid of cells that overlies and bounds pixels in the selected portion of the surface of the object in the output image. For each cell of the grid, an arbitrary rectangle having an area that bounds all samples in an original image affected by the pixels in the cell of the output image is defined. A union of all rectangles that are associated with the cells of the grid that intersect the area of the arbitrary rectangle is then determined to produce the output image. An index is preferably employed to map between a region in an input image and a corresponding region in the output image, and thus, to determine which portion of one of the input image and the output image should be changed if a portion of the other of the input image and output image has changed.

The transformation to achieve the desired effect typically includes mapping a texture onto the object in the output image, or applying a reflection to the object in the output image, or applying a refraction of the object in the output image (or a combination thereof).

The step of precomputing preferably includes the step of storing anti-aliasing data for use in producing the output image. The anti-aliasing data enable smoothing of edges in the output image.

The step of precomputing is preferably based on a set of rules that define what the desired resulting image will be. Typically, the resulting image will be a combination of three-dimensional (3D) geometry and/or a set of properties of the materials and a plurality of input images. The data produced by the step of precomputing also preferably include a lookup table in which parameters used in producing the output image are stored.

Another aspect of the present invention is directed to a computer-readable medium having computer-executable instructions for performing at least some of the steps of the method discussed above.

Yet a further aspect of the present invention is directed to a system that includes a display on which images are displayed, a memory for storing machine instructions, and a processor that is coupled to the display and the memory. When the machine instructions are executed by the processor, it implements functions that are generally consistent with the steps of the method discussed above.

BRIEF DESCRIPTION OF THE DRAWING FIGURES

The patent or application file contains at least one drawing executed in color. Copies of this patent or application publication with color drawings will be provided by the Patent and Trademark Office upon request and payment of the necessary fee.

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
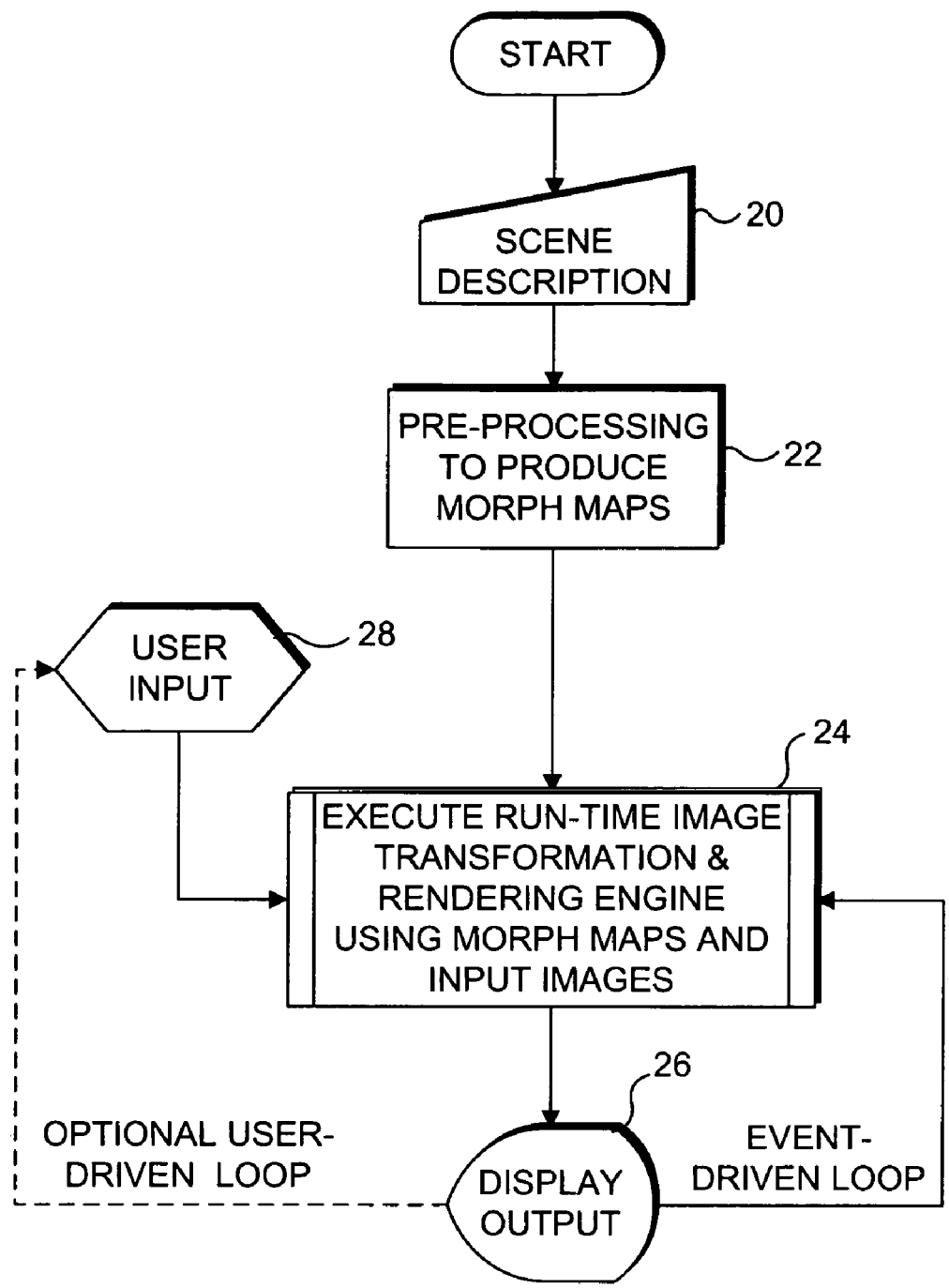
FIG. 1 is a flow chart illustrating the overall logic followed in implementing the present invention.

The present invention assumes that one or more images or scenes have been defined as a starting point to produce an output image in which a transformation corresponding to an effect is displayed. For example, the scenes might be a wire frame depiction of one or more objects and a corresponding plurality of images representing textures of surfaces on the object or in the background of the object as it will appear. It should be noted that if different views of an object are required to produce the desired output image, these views must be included within the images supplied as input or during the pre-processing step. The goal of the pre-processing step is to simulate the behavior of light illuminating surfaces of the object and other portions of a scene under defined circumstances and based upon the set of images that are input.

Optionally included in the pre-processing step are a 3D geometry and material properties of the object and other surfaces within the image that will be output. The material properties include texture, light reflectance value, roughness, translucency, light emittance (for objects that are a source of light), etc. In implementing the pre-processing step to generate morph maps that include the effects of lighting, any of a number of different well-defined algorithms and rules can be applied, including ray tracing of objects within the input scene and use of Phong illumination modeling, employing Snell's law of reflection. Under Snell's law, the angle at which a light ray is reflected from a surface is equal to the angle of incidence of the light ray on the surface, so that the path of each ray of light from a source can be traced as the rays are reflected from each surface in a scene.

In the present invention, the pre-processing step that is applied for carrying out the lighting simulation produces a plurality of intermediate results that are stored in lookup tables and generates indices used in the acceleration of the interactive run-time generation of the output image with a rendering engine that operates in real time. These lookup tables include data from the morph maps that are used by the real-time rendering engine to process the input images when producing an output image. During the processing of the morph map data by the real-time rendering engine, the input images can be dynamically warped and shaded to produce the output image. Typically, such graphic rendering is computationally expensive. However, in the present invention, the indexing mechanism that is employed enables the computation to be limited to just a minimum area necessary to render successive changes in the output image arising from a user input. Thus, only a small portion of an overall output image needs to be recomputed to show the changes that occur between successive images as a result of user interaction or in response to software events.

Also during the pre-processing step, anti-aliasing information is stored. The anti-aliasing information is created using a type of super-sampling algorithm that computes average values for a plurality of light rays passing through each pixel in a scene, thereby minimizing aliasing artifacts along the edges of objects. For example, a relatively thin object such as a rope is often rendered using ray tracing in a manner that produces substantial aliasing errors. However, by super sampling a plurality of light rays passing through each pixel lying along the rope, such errors are minimized and a more accurate rendering of the rope is produced.

The overall process implemented in the present invention is illustrated in FIG. 1. The scene description provided in a block 20 includes a plurality of input images as described above. These input images are supplied to a pre-processing step in a block 22 to produce the morph maps, which are indexed tables of data that define the results of a lighting simulation. The step identified in block 22 can include a modified ray-tracing algorithm and/or other well-known techniques for producing a rendered image. Further details of the steps required for modifying ray tracing to produce morph maps useful in connection with the present invention are described below.

The morph maps thus produced, a real-time rendering engine, and the input images are made available to an end user for use in producing desired output images in which changes responsive to a user input or software-generated event are rendered in real time, even on a relatively slow computer that does not have an advanced graphics video display adapter. The following steps thus typically occur when the present invention is used in an application such as a game. In a block 24, a run-time image transformation and real-time rendering engine is executed using the input images and the morph maps produced by the pre-processing step in block 22. Since the morph maps provide the required data, the output image can be rendered very efficiently, even by a comparatively slow processor, and only those changes occurring from one output image to the next in a relatively small portion of the output image must be computed in successive rendered images. As indicated in a block 26, the result produced is an output image that is displayed to the user. Changes in successive output images can occur, for example, as a result of an event during execution of a game or other application, or alternatively, can be caused as the result of user input, as indicated in a block 28. Changes caused in response to an event or in response to user input are often constrained to a relatively small portion of the output image, which is the only part of the image that must change between successive transformations executed by the rendering engine. Since only a small portion of an image must be rendered and the technique employing morph maps and input images in the present invention is relatively efficient, there is little delay in rendering each successive output image.

Morph Maps

The pre-processing step carried out by the present invention produces a morph map, which is preferably a planar area (e.g., a rectangular) map associating a set of pixel-dependent data of variable length with each (x, y) position as follows:

$$M(x,y) = (M_0(x,y), M_1(x,y), M_2(x,y), \ldots) \tag{1}$$

$$M_j(x,y) = (i, x_w, y_w, c, m, a, \alpha) \tag{2}$$

In these equations, $j \geq 0$ is an index that identifies a set of pixel data associated with a given pixel position (x, y); i is an image identifier that, if positive, indicates an input image to which the sampling coordinates (x, y) refer, or, if any negative value is used for i, indicates that a constant color is to be applied to the pixel; $x_w$, $Y_w$ are sampling coordinates in the specified source image; c is a constant color that is used for the pixel instead of the sampling coordinates just noted if the value of i is negative; m is a multiplicative component used to modulate the result for the specified pixel; a is an additive component used to shift the result (i.e., to vary the saturation at the current specified pixel); and $\alpha$ is a blending factor, which can be incorporated in the m and a terms under certain situations, as explained below.

For each pixel in the output image, the color is determined by the real-time rendering engine using the following equations:

$$P(x, y) = \frac{\sum_j \alpha(mC_j + a)}{A(x, y)} \quad (3)$$

where $$A(x, y) = \sum_j \alpha \quad (4)$$

and $$C_j = \begin{cases} I_i(x_w, y_w), & \text{for } i \geq 0; \text{ and} \\ c, & \text{otherwise} \end{cases} \quad (5)$$

The color component used in the computation $C_j$ is either a constant color indicated by c (if the value of i is negative), or is based upon the dynamic sample of a specific one of the input images (i.e., the input image indicated by a positive value of i). By using these relatively simple equations to determine each pixel in the output image that is affected by a transformation, the real-time rendering engine is very efficient in producing the output image, particularly since only those pixels that are changed need to be recomputed in successive output images. Furthermore, the computed color values P(x, y) can be outside the spectrum of representable colors and must be brought within that range through a saturation operation performed as the very last step:

$$O(x, y) = \begin{cases} C_{\min}, & \text{if } P(x, y) < C_{\min} \\ C_{\max}, & \text{if } P(x, y) > C_{\max} \\ P(x, y), & C_{\min} \leq P(x, y) \leq C_{\max} \end{cases} \quad (6)$$

Where $C_{min}$ is the minimum representable color (typically 0 for monochrome images or the (0, 0, 0) triplet for RGB color images) and $C_{max}$ is the maximum representable color (typically 255 or (255, 255, 255)). These values depend on the chosen color representation and space chosen for the morph map computations, which in most cases will be simply the RGB system with one byte per component.

A special case of the present invention referred to as "a non-blending morph map" occurs when there is only one set of data associated with each pixel position. In this case, which was implemented in the prior art game PANDORA'S BOX™, the value p is a constant zero, and the value of a is irrelevant since there is only one input image. Consequently the value for i is also simplified. The non-blending morph map is defined by the following equations:

$$M'(x,y)=(i,x_w,y_w,c,m,a) \quad (7)$$

$$C_j = \begin{cases} I_0(x_w, y_w), & i = 0 \\ c, & i \neq 0 \end{cases} \quad (8)$$

Because of the use of tables of data produced by the pre-processing step, the run-time implementation for non-blending morph maps in the prior art is much more efficient in both speed and space, and was substantially compact.

In another special case of the present invention that uses "fixed-support morph maps," the a values add to a known constant value, as indicated by the following equation:

$$A(x_i,y_i)=A(x_k,y_k)=\overline{A}, \forall i,k \quad (9)$$

Because of the preceding relationship, which was not in the prior art release, it is possible to optimize the computation, as well as the storage of the morph maps, to take advantage of the fact that the a component can now be incorporated into the m and a components as provided by the following equation:

$$O(x, y) = \frac{\sum_j \alpha m C_j + \alpha a}{\overline{A}} = \frac{\sum_j m' C_j + a'}{\overline{A}} \quad (10)$$

As will be evident from the rightmost side of Equation (10), a substantial simplification is made by using terms m' and a', which respectively correspond to αm and αa during the computation of the values for the pixel at position x and y in the output image.

Since the preceding two cases are specialized, it is perhaps more important to consider the generic morph maps, which are not based on special cases. However, both the non-blending morph map and the fixed-support morph maps are important, since they illustrate the greater efficiency that results from using morph maps for the special cases that they represent.

Image Transformation

From the preceding explanation, it should be apparent that each morph map provides a set of data associated with each pixel position (x, y) in the output image that is used by the real-time rendering engine. The real-time rendering engine performs a computation at each pixel position as defined by the following pseudo code. The computation represented by the pseudo code can be performed independently for each color component (e.g., red, green, and blue in an RGB system), or can be simultaneously performed for the three color components at one time, since the computation readily supports parallelism using single-instruction, multiple-data instruction sets. As will be evident from reviewing the pseudo code that follows, the morph map is employed by the rendering engine to define how the output pixels are composed, based upon the data for the input pixels, so that the resulting computation is actually an inverse mapping/morph.

```
For each pixel p with coordinates x, y
{
    colorsum = 0
    alphasum = 0
    For each pixel-dependent data M_j(x, y)
    {
        If M_j.i >= 0
            color = I_i(M_j.x_w, M_j.y_w) (sample source image at
```

-continued

```
         warped position)
      Else
          color = M_j.c
      Endif
      colorsum = colorsum + M_j.α * (M_j.m * color + M_j.a)
      alphasum = alphasum + M_j.α
   }
   O(x, y) = colorsum/alphasum      (write out final
   pixel value)
}
```

In the above pseudo code, the values colorsum and alphasum are initialized to zero for each coordinate of a pixel at position (x, y) in the output image. Then, using the morph data in a set j if the value of i is not negative, the value color is set equal to the color of the pixel at $(x_w, y_w)$ of the input image i. However, if the value of i is negative, then the color of the pixel in the output image is defined by the value c. Further, the variables colorsum and alphasum are as defined in the pseudo code. Finally, the pixel in the output image is then defined as the quotient determined by dividing colorsum by alphasum. Note that the alphasum variable is unnecessary in the fixed support morph map special case as it will always equal 1 for every pixel.

indexing Mechanism

During the application of the present invention, it is extremely useful to minimize the computations required by simply reapplying a morph map to a minimal set of pixels that must be recomputed to display an effect or transformation. In most cases, only a small portion or patch in an image is affected by a change at any given time, so that by only recomputing the portion of the output image that is changed, a substantial reduction in the number of required computing resources is achieved. To ensure that only the minimum set of pixels is recomputed, the present invention employs an index mechanism that maps regions in the input images to the corresponding regions in the output images and vice versa. The index mechanism determines which region in an output image must be recomputed based upon a change to a region in the input image and vice versa.

To accomplish the index procedure, the mapping problem is divided between the two distinct directions, i.e., input to output mapping, and output to input mapping. It should be noted that the way in which each individual input image relates to the output image is essentially independent of the relationship between the other input images and the output image. Accordingly, separate maps are required for each input image and for each direction. For example, as shown in the input image of a woman and a cheetah in FIG. 12 and the partially morphed image of a creature in FIG. 13, the nose of the morph image creature maps to the nose of the woman and to that of the cheetah, and all three of the noses (the two original and the morphed image) will likely be at different Cartesian coordinates (xy) in their respective images. Furthermore, it should be understood that the mapping may potentially be "many to many" in both directions. In the following representation, $D_I$ is defined as the set of all possible subsets of the domain of definition for an image I (one of the input images), and $D_O$ is the set of all possible subsets of the domain of an output image O. The index is defined by the following function:

$$\psi_i : D_{I_i} \to D_o, A \in D_{I_i} \mapsto B \in D_o \text{ such that } \forall a \in A, \forall k \Leftrightarrow S_i(a, k) \in B \quad (11)$$

(Note that A in the preceding function is not the same as the A in Equation (9).) In this function, $S_i$ is a sampling function for input image $I_i$ derived from the morph map M, associating the warped point $(M_k(x,y).x_w, M_k(x,y).y_w)$ with each point a having coordinates (x, y). Also, k is an arbitrary integer enabling the "many to many" mapping by identifying the image that is being used.

Actual computation of such a function would be extremely complicated in the general case, but since the morph maps relate to rectangular domains, in this particular case of $D_I$, the computation is relatively easy to approximate, and thus, very easy to implement.

Figure 9:
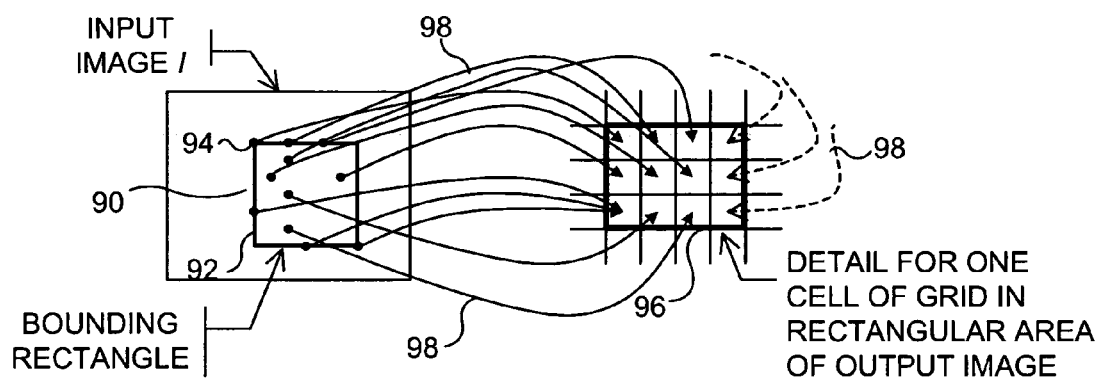
FIG. 9 is a schematic diagram illustrating mapping between cells in an input image and corresponding cells in an output image, as is done in one preferred embodiment of the present invention.

This approximation is graphically illustrated in FIG. 9. In this figure, a single-bounding rectangle 90 is illustrated on the left in a portion of an input image I. Associated with single-bounding rectangle 90 is a corresponding cell 96 in a grid overlying the output image. Additional cells of this grid are associated with arbitrary rectangles that bound all of the samples in input image I affecting the corresponding subset of pixels in O, i.e., the pixels that are inside the corresponding cell of the grid in the output image. The pixels in the source or input image are determined by scanning morph map $(M_{x,y})$ for cell 96. In this illustration, arrows 98 connect the pixels in the bounding rectangle of source image I with cell 96 in the grid of the output image. Only a portion of the arrows identified by dash lines are included, but they are totally analogous to the solid arrows relating the pixels in the source image to the grid cells. This same process is carried out for each grid cell in output image O and for each corresponding bounding rectangle in input or source image I. An approximation bounding all pixels in the input image I that affect a given rectangular image R in the output image is simply then the union of all of the bounding rectangles associated with any grid cells that intersect rectangular area r in the output image O.

Use of Morph Maps

Using the morph map data structures, which disassociate the actual computer graphic algorithms that are used in the pre-processing step to create these data structures from the real-time computations that display an output image resulting from an image transformation, it is possible to implement an efficient image transformation using the morph maps and the real-time rendering engine. Several important and useful computer graphic techniques can thus be indirectly employed to obtain real-time imagery in the output image. Typically, without the use of extremely high-speed graphic work stations or powerful video graphic display adapters that implement the functions of such work stations, it would not be possible to achieve these computer graphic techniques in real time. However, the morph maps produced in accord with the present invention enable the real-time rendering to be done on substantially slower computers without requiring a powerful video graphic display adapter. Several examples are discussed below to illustrate how morph maps are used in the present invention to enable real-time rendering of effects.

A first exemplary application of morph maps is directed to image morphing. Image morphing is frequently used in special effects to achieve a transformation from a first image of one object to a second image of another object through a series of rapid changes, wherein the first image of an original object seems to meld or change into the second image of the other object. Conventionally, image morphing can be assumed to be conceptually equivalent to a range combination of two warped images. The warps performed on the images are described by two functions $W_1$ and $W_2$ that provide inversely warped coordinates from the output coordinates, generally as follows:

$$W_1(x,y)=(W_1^x(x),W_1^y(y))=(x_w,y_w) \text{ and } W_2(x,y)=(W_2^x(x),W_2^y(y))=(x_w,y_w)' \quad (12)$$

The results of the warped functions are then combined with a cross-dissolve, using either a constant blend factor or a spaced-variant blend factor, which is also referred to as a local control blend factor. The combination is described by the following equation:

$$O(x,y)=f(x,y)I_1(W_1^x(x),W_1^y(y))+(1-f(x,y))I_2(W_2^x(x),W_2^y(y)) \quad (13)$$

A fixed-support morph map in accord with the present invention can easily describe the preceding operations. In this case, it is assumed that a two-image morph, which is the most common case, is employed, wherein $M(x,y)=(M(x,y), M_2(x,y))$, and wherein $M_1$ and $M_2$ are simplified as follows:

$$M_1(x,y)=(1,x_w,y_w,c,m,0) \quad (14)$$

$$M_1(x,y)=(1,W_1^x(x),W_1^y(y),-,f(x,y),0) \; M_2(x,y)=(2,W_2^x(x),W_2^y(y),-,1-f(x,y),0) \quad (15)$$

The mapping from the morphing equations to the morph map definition is very straightforward. Two sets of pixel data are associated with every output pixel, one sampling input image 1 and the second sampling input image 2, and their results are blended by the f(x,y) space-variant blend factor, with the sampling coordinates distorted by the respective warping functions. Note that the c parameter is irrelevant (since i is never negative in Eq. (15)), and the a parameter is also not needed for simple morphing and is set to 0 above.

Although morph maps can be created in a number of different ways, ray tracing is a very flexible technique for constructing morph maps. Most advanced 3D modeling and rendering packages can readily be modified to produce data required to create a morph map for use in connection with the present invention. As noted above, the morph map can be used for real-time rendering related to limited changes occurring in response to events or user input.

For example, assuming that no anti-aliasing is required, a single information packet is employed for each pixel. This case can be represented by a non-blending morph map as follows. A typical prior art ray tracing follows the following steps:

```
For each pixel p
{
Find nearest object O at p
If O exists
    Compute local illumination at intersection
    Compute global illumination at intersection
    Color(p) = Combined local, global, and texture information
Else
    Color(p) = background color
Endif
}
```

The preceding algorithm can be modified to compute morph maps for use in storing intermediate information according to the following:

```
For each pixel p
{
    Find nearest object O at p
    If O exists and is a dynamic object
        Compute local illumination at intersection
        m = local diffuse illumination
        a = local specular illumination
        Compute global illumination at intersection
        If O is reflective or refractive
            Trace reflected or refracted ray R
            u, v = texture coordinates from R.O (reflected or
                   refracted object)
            m = m * R.m (blend local illumination with
                          reflected or refracted illumination)
            a = a + R.a    (saturated sum)
        Else
            Get texture coordinates u,v from O
        Endif
        M' (x, y) = (0, u, v, 0, m, a)
    Else if O exists and is NOT a dynamic object
        Compute local illumination at intersection
        Compute global illumination at intersection
        c = Combined local, global and texture information
        M' (x,y) = (-1, 0, 0, c, 1, 0)
    Else
        M' (x, y) = (-1, 0, 0, background color, 1, 0)
    Endif
}
```

The preceding steps create a morph map that can be applied with a single input image (a texture) and used to map it onto an object O or to deform or apply a refraction/reflection algorithm to it. If the texture changes, for example, if it is derived from a video source, the morph map can then be used to quickly (in real time) recompute the resulting image.

While the preceding example did not employ anti-aliasing, it is clear that much better images can be achieved using anti-aliasing, although with a reduction in performance and efficiency. An appropriate anti-aliasing algorithm that adapts well to morph maps is any form of super sampling. In super sampling, a warped object is sampled at a frequency substantially greater than the Nyquist rate. Essentially, multiple samples are taken at each pixel, and they are averaged and thus filtered to yield a final color value for the pixel. A popular well-known algorithm for choosing the samples is the distributed ray-tracing algorithm. In this algorithm, several scene parameters can be jittered, or perturbed, providing multiple samples that are based on a grid overlying the pixel. For example, the jittered parameters may include time (to achieve motion blur), lighting positions (to achieve soft shadows), and camera parameters (for example, to vary the depth of field). These various parameters can all be supported in a generic morph map. However, it is easier to understand the technique if a simpler example is used, in which a few perturbed samples are provided for each pixel. In this example, each sample corresponds to one set of data associated with the pixel, computed as described above.

Figure 10:
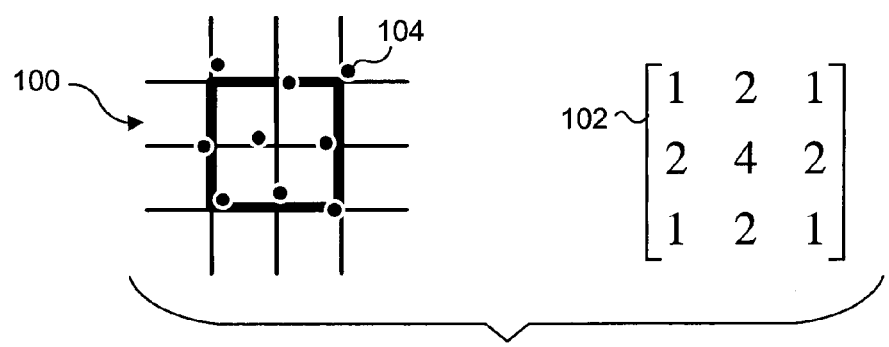
FIG. 10 is schematic example of samples in a "jittered grid" and a weighting matrix corresponding thereto.

In the distributed ray-tracing algorithm, each of the pixels of an output image corresponds to a number of samples 104, e.g., k samples. These samples are organized as a jittered grid 100 as shown on the left side of FIG. 10, wherein k=9, and the pixel area is indicated within the rectangle circumscribed by the bold line. Each of the samples corresponds to a weight, which in the simplest case is approximately a center-weighted Gaussian distribution, as indicated in a matrix 102 shown on the right side of FIG. 10. To use the jittered grid and corresponding matrix with a fixed-support morph map, each of the samples, s ($1 \leq s \leq k$), is computed in accord with the steps shown above. The result is a set of data $M_s$ associated with pixel p. The first step of the above algorithm, in which the nearest object O is found at p, actually uses the jittered position of the sample s instead of the center of the pixel. For each set of data, $M_s a$ corresponds to the weighted value of a sample weight matrix, such as matrix 102. Since the same number of samples is taken for each pixel, the sum of all the alpha values is a constant, producing a fixed-support morph map. Further optimization can be achieved by including the alpha values with the m and a components rather than storing them explicitly in the data $M_s$. When applying the resulting morph map, the alphasum variable does not need to be computed for each step, since it is actually a constant value. For example, in matrix 102, the alpha value is equal to 16.

EXAMPLES SHOWING PRIOR ART USE OF MORPH MAPS

As noted above, an earlier version of the present invention that included a subset of the features it provides was used in Microsoft Corporation's PANDORA'S BOX™ game. This earlier release as used in the game was only capable of implementing a non-blending morph map and thus could not morph objects or implement anti-aliasing as described above, because it did not employ multiple input images, multiple sets of pixel data, or a blending (alpha) factor. In addition, it could not produce colored modulation and highlights and was incapable of full ray-tracing functionality. Nevertheless, it is helpful to view some of the images included within this previously released game, since they illustrated some of the functionality (although a subset of the functionality of the present invention) and are helpful in explaining how the present invention can be applied in rendering real-time images that are responsive to events and user input.

Figure 2:
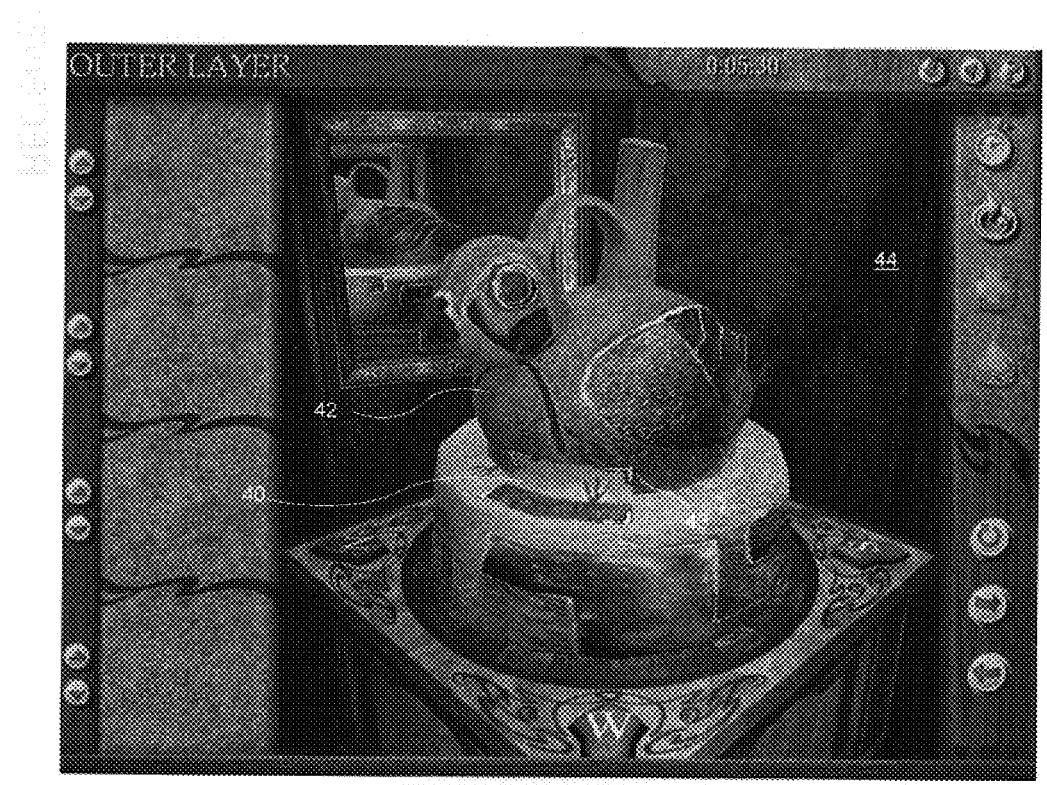
FIG. 2 is a color graphical image illustrating an object on which a patch on the object has been selected, as indicated by brackets at each corner of the patch.

In FIG. 2, an image 44 from PANDORA'S BOX™ game illustrates a rectangular patch 40 on the surface of an object 42. Rectangular patch 40 is indicated by yellow brackets 43. In this image, rectangular patch 40 has been inverted from its original position, illustrating how a selected portion of an image rendered with the real-time rendering engine of the present invention can be manipulated, such as by flipping the patch horizontally, as in this example, and then re-rendering the flipped patch in real time. Since only a small portion of image 44 has changed, the time for rendering the image following the change caused by the user's action is relatively short. Only patch 40 needs to be rendered in real time in response to the user selectively flipping the patch, since the remainder of the image is the same as in the previous image.

Figure 3:
FIG. 3 is a color graphical image of the object and the patch of FIG. 2 displayed with the present invention, using a morph map that is an identity, causing the texture of the object to be fully unwrapped.
Figure 4:
FIG. 4 is a color graphical image of the same object and patch of FIG. 2, from a different view point.

In FIG. 3, patch 40 is illustrated using a morph map 50 that is an identity, i.e., the warped coordinates $(x_w, y_w)$ of the morph map at $M_f(x, y)$ are actually $(x, y)$ for all pixels. Use of this identity causes the texture applied in image 44 to be shown in FIG. 3 as fully unwrapped. It should be evident how the texture shown in FIG. 3, which comprises a 2D surface, is mapped onto a 3D surface of an object and rendered in real time using a subset of the present invention. The mapping process relates the texture applied to each pixel position in the image to a corresponding pixel in the texture. FIG. 4 includes an image 44' showing object 42 from a different viewpoint to illustrate how the same texture from FIG. 3 is mapped onto object 42, which has been rotated approximately 90° counterclockwise in image 44' compared to image 44.

Figure 5:
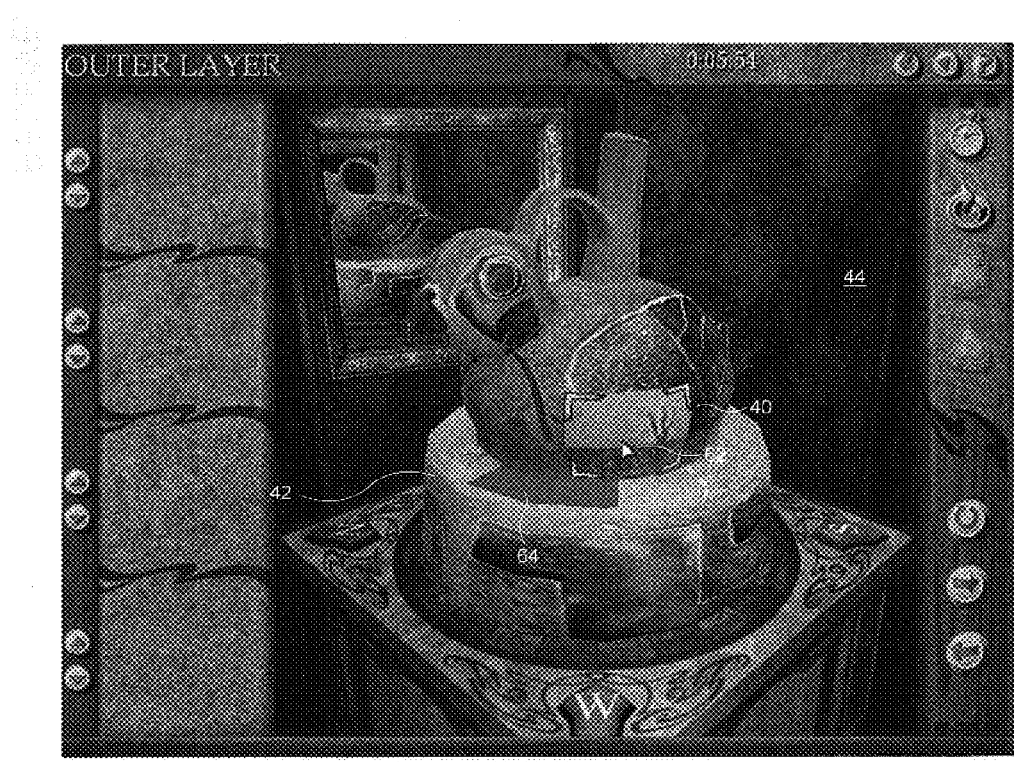
FIG. 5 is a color graphical image illustrating the patch being warped with the present invention as the patch is dragged over the object.
Figure 6:
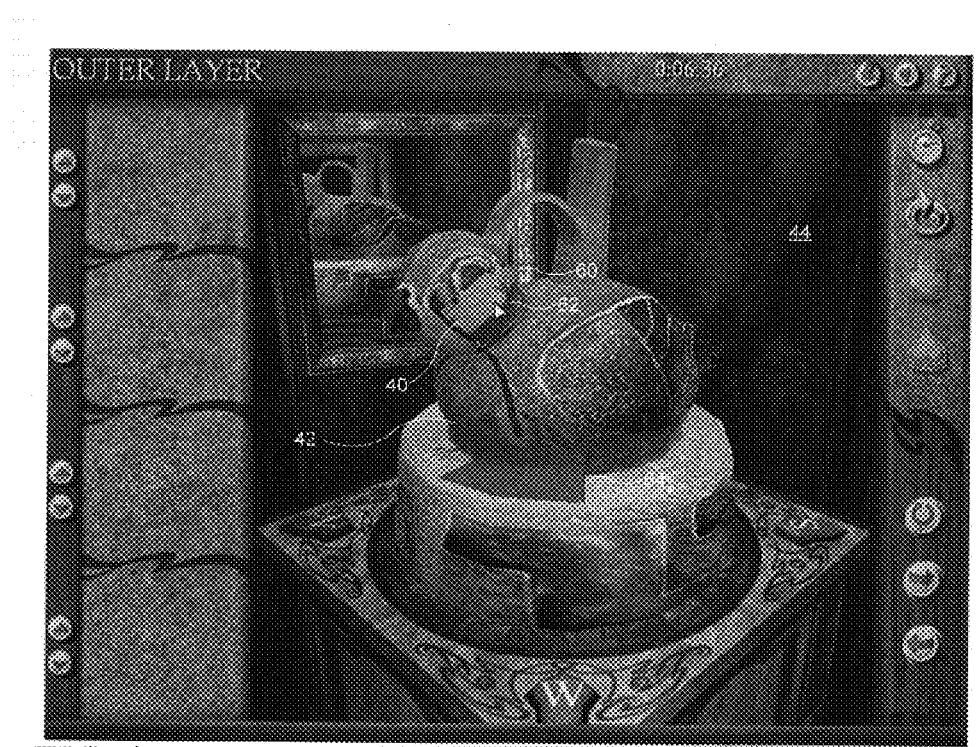
FIG. 6 is a color graphical object like that of FIG. 5, but showing the patch dragged to a different position on the object.

As shown in image 44 of FIGS. 5 and 6, small rectangular patch 40 has been selected with a cursor 62 and moved from a previous position 64, over the surface of object 42, and onto a head portion 60. As the user manipulates small rectangular patch 40 with cursor 62, the real-time rendering engine is able to continually update the small area of the image on which small rectangular patch 40 appears in real time. Rectangular patch 40 is thus dragged and warped over the surface of object 42 in real time in a series of successive images, only two of which are shown in FIGS. 5 and 6.

Figure 7:
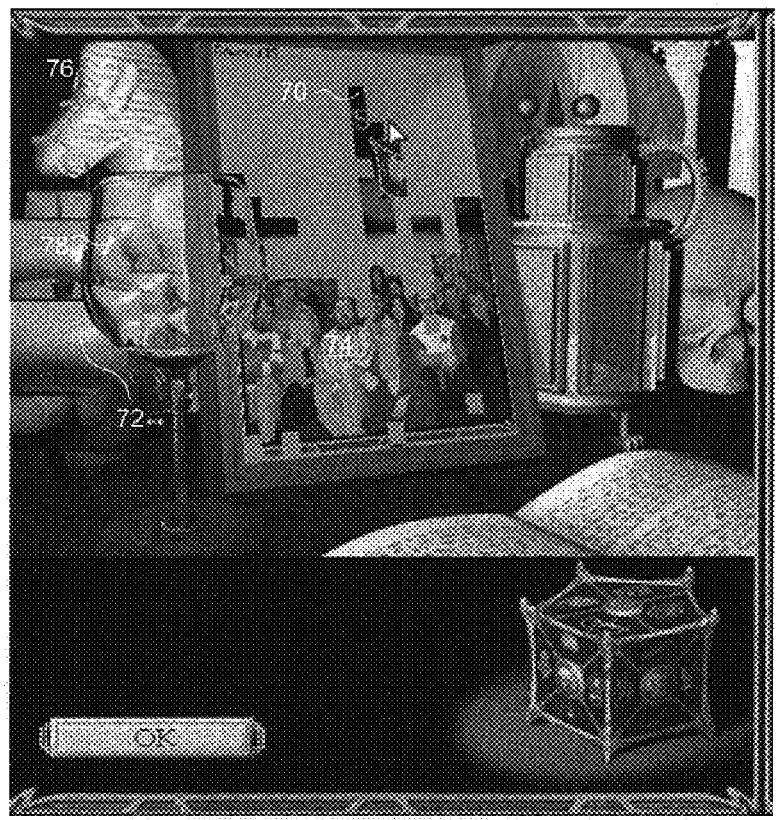
FIG. 7 is a color graphical image example showing how the present invention is employed to warp a two-dimensional (2D) surface through a morph map to provide a 3D appearance.

Yet another example showing an arbitrary 2D surface being warped with a morph map to have a 3D appearance is illustrated in FIG. 7. The software comprising the game initiates the fall of blocks 70, and the user directs the falling blocks to create an image 74. Additional objects 72, 76, and 78 are also illustrated in this Figure. Light reflected from objects 72 and 76, and from image 74 on the falling blocks is made to appear diffracted as it is transmitted through the glass of object 78 (a water goblet). Again, the real-time rendering engine is able to warp the texture map for each of these objects disposed behind the water goblet to provide the diffracted image corresponding to the diffraction of light passing through the water goblet. Only the image on the falling blocks changes as the blocks pass behind the goblet, so only the portion of the overall image corresponding to the area of the moving blocks needs to be rendered in successive images of the scene. Since the blocks are relatively small compared to the overall size of the scene being rendered, very little computing time is required to render the small portions of the scene that are changed in successive images of the scene.

Figure 8:
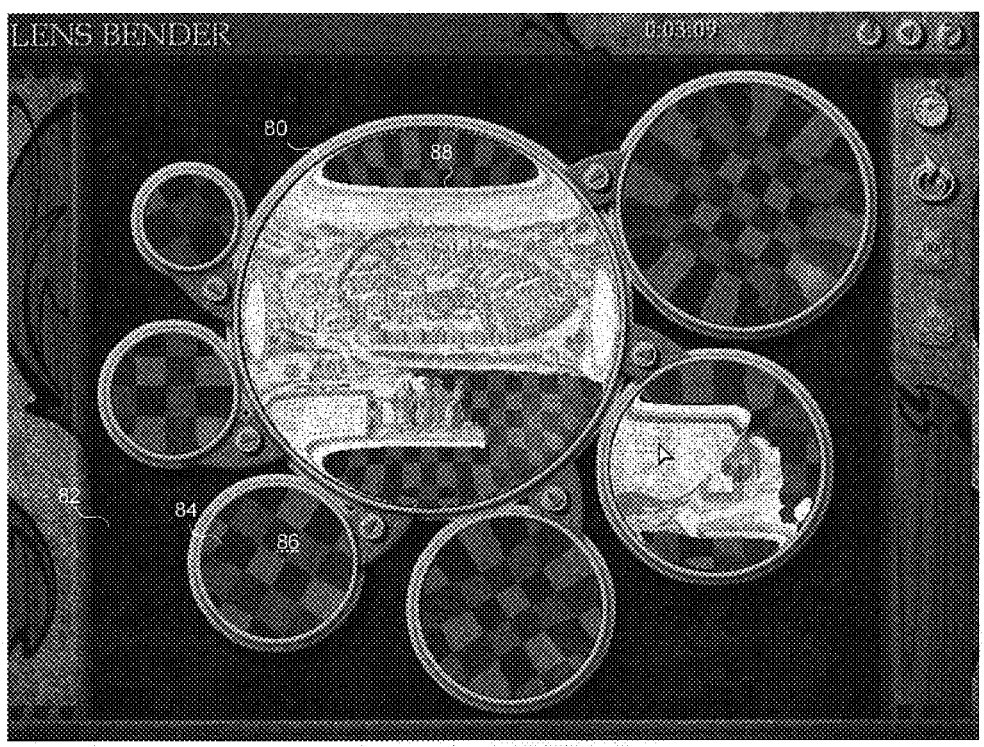
FIG. 8 is a color graphical image rendered using the present invention to create glass crystal distortions with morph maps created from light refraction computations derived from grayscale images describing the geometry of the glass.

FIG. 8 provides yet a further illustration showing how glass distortion is rendered in real time using morph maps. In this example, the morph maps were created using light refraction computations derived from gray-scale images describing the glass geometry of a plurality of lenses 84 in an image 82. An underlying surface 86 visible through the lenses comprises a checkerboard. Through a largest lens 80, a map 88 is shown, as distorted by the glass comprising the lens. The morph maps for this example each include data that determine how a texture is warped to produce the image of that texture as seen through the glass of each lens.

Illustrative Applications of the Present Invention

Figure 12:
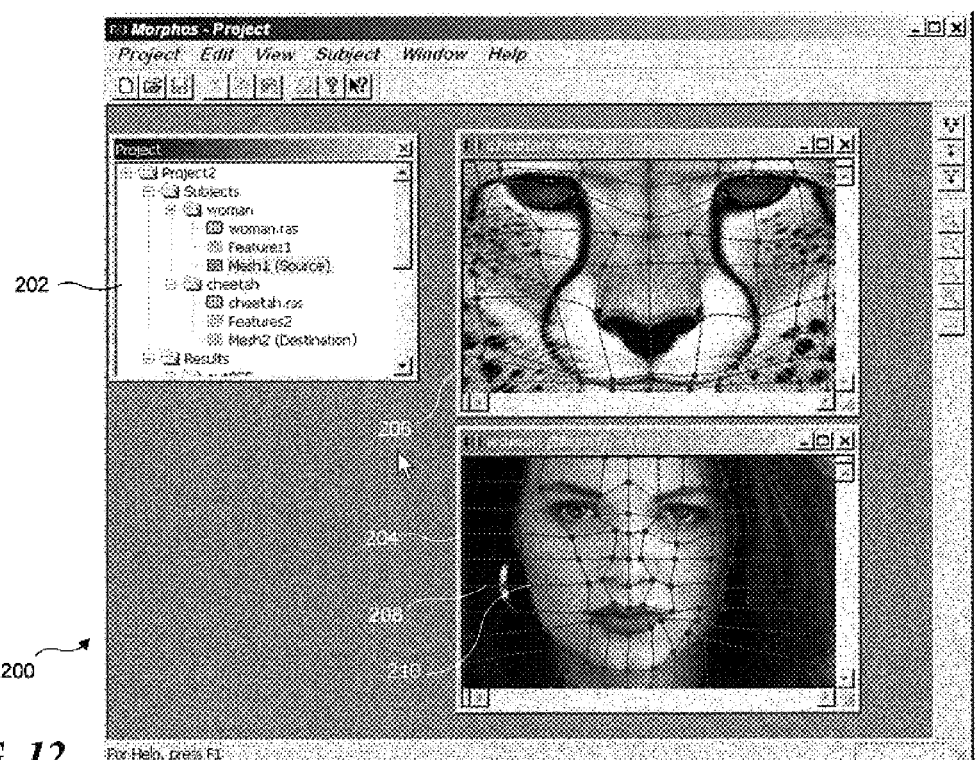
FIG. 12 is a color graphic image of an exemplary display screen in which two meshes are employed to specify a pixel-by-pixel relationship between two 2D spaces for purposes of producing a morph between images in the two spaces and used in the present invention for creating a morph map for the specification.

The previous release of a subset of the present invention was incapable of rendering the morphing of an image of a first object into an image of a second different object. Accordingly, the rendering of classical morphing is an excellent example of the additional functionality provided by the present invention compared to the earlier subset included in the prior art product that was previously sold. As noted above, any of a variety of different computer graphic techniques can be used to create the morph maps used by the present invention in connection with the real-time rendering engine to produce output images in which the image of one object appears to change into that of a different object. Although a number of other programs are available to provide the data included in a morph map, a simple straightforward morphing system called MORPHOS™ was included in software provided with the book entitled "Warping and Morphing of Graphical Objects," by Jonas Gomes, Lucia Darsa, Bruno Costa, and Luiz Velho, published by Morgan Kaufmann Publishers, Inc. (1999). FIG. 12 illustrates an exemplary graphics display screen 200 produced by executing the software included with this book and shows a file-browsing window 202, an image 204 of a woman, and an image 206 of a cheetah. Overlying images 204 and 206 are meshes 208 on which corresponding points 210 are designated. Mesh 208 in each image determines how one image is warped into the other image through a succession of intermediate images. It should be emphasized that the present invention does not create the original or intermediate images that are required to carry out the morphing between the images of the woman and the cheetah. Instead, the present invention simply employs the morph maps that are created by using the data derived from successive images produced during a pre-processing step using the morphing software system included with the above-noted book. Also, it must again be emphasized that the technique used for creating the morph map data is simply one of a number of well-known techniques that can alternatively be employed in this pre-processing step to generate the morph data used by the present invention to facilitate real-time rendering to change an image of one object into an image of another object.

In the technique that is illustrated, the two meshes employed on each of the images define the correspondence between pixels in two different 2D spaces (the images of the woman and the cheetah and the points on those meshes simply provide a reference for making the successive images used in displaying the change from the image of one object to that of the other). The MORPHOS™ system, not the present invention, employs a morphing algorithm to determine the exact pixel-by-pixel correspondence between the images of the woman and the cheetah. However, any of the other well-known algorithms and methods for creating the correspondence between pixels in an initial image and pixels in a final image can alternatively be used.

Figure 13:
FIG. 13 is a color graphic image of a 50%—50% blend of the exemplary images shown in FIG. 12, produced using the present invention.

Whichever approach is used, successive images are created by the morphing program to produce morph maps for the desired morph specification and for each given blend. For example, FIG. 13 shows a particular example 212 in which approximately 50 percent of each of the image of the woman and the image of the cheetah are combined. A morph map created from each successive image produced by the morphing program enables the morphing process to be implemented as a real-time animation by the present invention using the morph maps and the input images. It must be stressed that the intermediate images are not required after the morph maps for those intermediate images have been produced. Also, if a small change occurs in one of the input images, it is only necessary to recompute a limited area corresponding to that change in the output image by passing the new changed input image through the real-time rendering engine, to recompute an updated output image.

Figure 14:
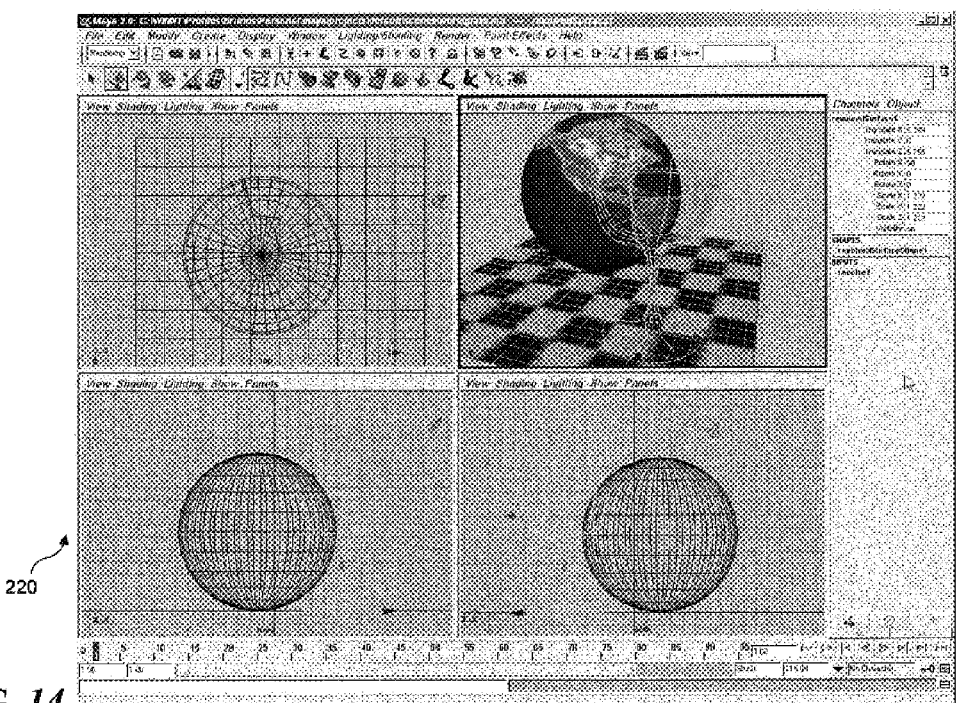
FIG. 14 is a color graphic image of an exemplary display screen in a rendering program, illustrating how a morph map is created for two objects for use in the present invention.

Yet another example in which the present invention will more typically be used involves the rendering of objects by combining morph maps and by using the alpha or blend parameter to control the appearance of the resulting output image. The morph maps that are produced for real-time rendering of a 3D scene with the present invention can include data developed from a number of different rendering programs. Furthermore, a variety of different objects can be employed in creating a 3D scene that is rendered with the present invention. For example, the objects can be polygonal or can be based on high-order surfaces such as a Non-Uniform Rational B-Spline (NURBS)-defined object. An example of one suitable rendering program for use in creating the morph maps for various objects is illustrated in FIG. 14. In this Figure, a graphic display screen 220 illustrates various aspects of the rendering process. This exemplary page illustrates several different ways in which a 3D scene can be specified in a 3D rendering program called MAYA™, which is only one of many different rendering programs that are suitable for developing the data included in morph maps used by the present invention. This exemplary graphics view illustrates how object properties are defined for a polygonal shape and a NURBS-defined wine-glass. These properties include transparency, color, index of refraction, and textures. Also indicated are the positioning of lights placed arbitrarily to illuminate the scene. The rendering program also enables a user to choose a camera, including lens type, location, and aiming direction. Based upon the specification entered by a user, a combination of many available and known rendering algorithms can be used to determine the behavior of light in a scene and to determine what would be finally visible through the camera at each pixel position. Thus, for each pixel, the output of the rendering process is either a specification of the precise color that is ultimately visible at each pixel, or a determination of the pixels of the input image that must be used and a combination of operations that must be done to determine the final color of each pixel. From this information, the morph maps used in the present invention are determined, as explained above.

Figure 15:
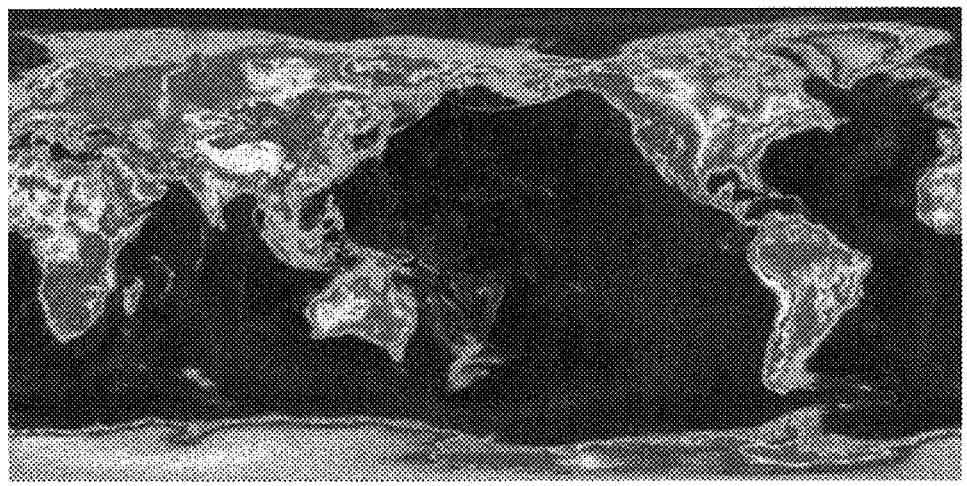
FIG. 15 is a color graphic image showing an exemplary texture that will be applied to a morph map for the objects shown in FIG. 14 to produce a real-time rendering of the objects.
Figure 16:
FIG. 16 is a color graphic image illustrating an exemplary real-time rendering of the objects of FIG. 14 using the morph map produced therein and the texture shown in FIG. 15.

Once a morph map has been created for a scene, as seen through a camera and given the various parameters noted above, the scene specification is no longer relevant, since all necessary information is now provided in the morph map. Furthermore, the real-time rendering engine can then render an output image with the morph maps and the input images thus provided. For example, an unwrapped 3D texture 230, which is illustrated in FIG. 15, can be applied to the morph map derived from the data, as described above, to render an output image 240 in real time, as shown in FIG. 16. In this Figure, the checkerboard pattern is defined simply as a function of the color of each pixel comprising the checkerboard, as part of the morph map. Thus, it is not necessary to include an input image like that shown in FIG. 15 for the checkerboard.

Figure 17:
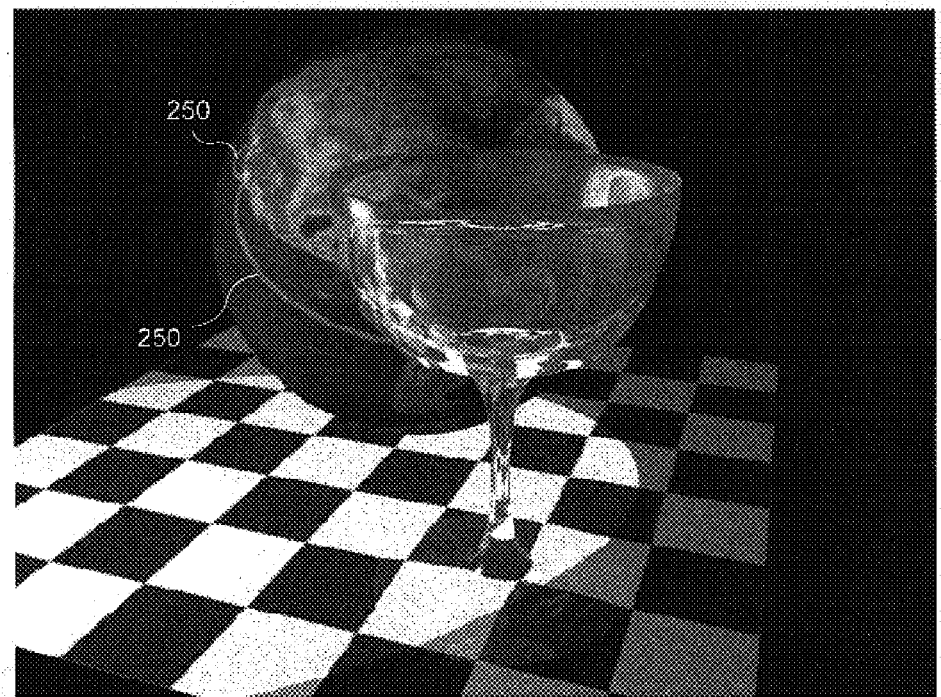
FIG. 17 is an updated exemplary color graphic image rendered in real time by the present invention, illustrating the effect of making a change in one of the input images used to produce the morph map.

In FIG. 17, the input image has been changed by adding lines 250, which might, for example, indicate airline flight paths. As a result, an output image 242 can be updated in real time with the present invention, to include these changes to the input image. The present invention is able to implement much more realistic images than were possible in the subset of functions included in the prior art game program by using the alpha blending capability, and by combining morph maps to produce an output image as described above. Accordingly, the present invention offers far greater opportunity for implementing real-time rendering of changes in an image in a more realistic manner than the earlier version that is in the prior art.

Exemplary Personal Computer System for Implementing the Present Invention

Figure 11:
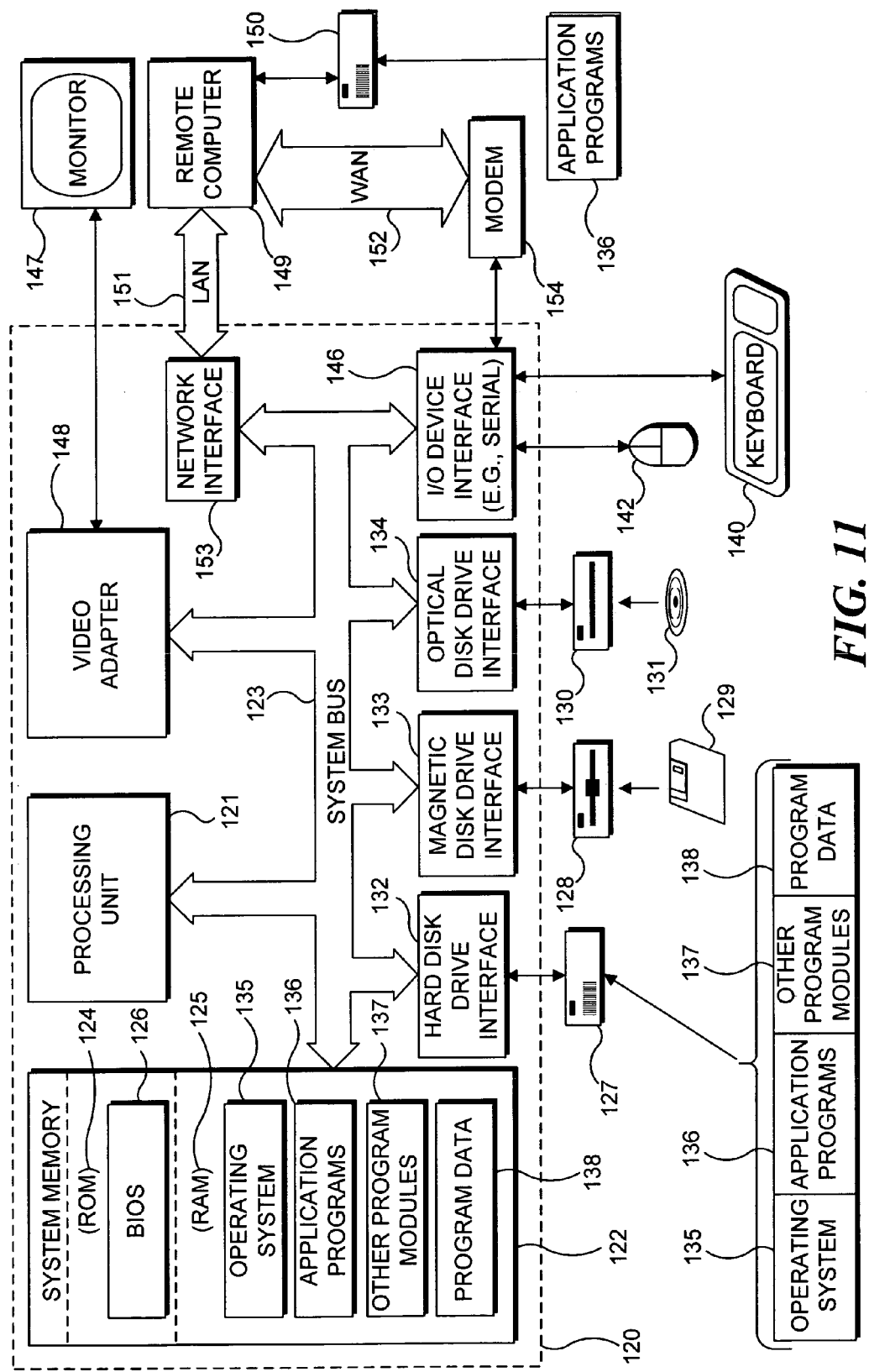
FIG. 11 is a schematic block diagram of an exemplary personal computer (PC) system suitable for implementing the present invention.

It should be emphasized that the present invention can be implemented with almost any type of computing device and is not limited to use with a personal computer. However, an initial preferred embodiment of the present invention was designed to be implemented with a personal computer. With reference to FIG. 11, an exemplary system for implementing the present invention includes a general-purpose computing device in the form of a conventional personal computer 120, provided with a processing unit 121, a system memory 122, and a system bus 123. The system bus couples various system components, including the system memory, to processing unit 121 and may be any of several types of bus structures, including a memory bus or memory controller, a peripheral bus, and a local bus using any of a variety of bus architectures. The system memory includes read-only memory (ROM) 124 and random access memory (RAM) 125. A basic input/output system (BIOS) 126, containing the basic routines that help to transfer information between elements within the personal computer 120, such as during start up, is stored in ROM 124. Personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131, such as a CD-ROM or other optical media. Hard disk drive 127, magnetic disk drive 128, and optical disk drive 130 are connected to system bus 123 by a hard disk drive interface 132, a magnetic disk drive interface 133, and an optical disk drive interface 134, respectively. The drives and their associated computer-readable media provide nonvolatile storage of computer-readable machine instructions, data structures, program modules and other data for personal computer 120. Although the exemplary environment described herein employs a hard disk, removable magnetic disk 129, and removable optical disk 131, it will be appreciated by those skilled in the art that other types of computer-readable media, which can store data that is accessible by a computer, such as magnetic cassettes, flash-memory cards, digital video disks, Bernoulli cartridges, RAMs, ROMs, and the like, may also be used in the exemplary operating environment.

A number of program modules may be stored on the hard disk, magnetic disk 129, optical disk 131, ROM 124, or RAM 125, including an operating system 135, one or more application programs 136 (such as a browser program), other program modules 137, and program data 138. A user may enter commands and information into personal computer 120 through input devices such as a keyboard 140 and a pointing device 142. Other input devices (not shown) may include a microphone, joystick, game pad, satellite dish, scanner, or the like. These and other input devices are often connected to processing unit 121 through an input/output (I/O) device interface 146 that is coupled to the system bus. The term I/O interface is intended to encompass each interface specifically used for a serial port, a parallel port, a game port, a keyboard port, and/or a universal serial bus (USB). A monitor 147 or other type of display device is also connected to system bus 123 via an appropriate interface, such as a video adapter 148, and is usable to display Web pages, and/or other information. In addition to the monitor, personal computers are often coupled to other peripheral output devices (not shown), such as speakers (through a sound card or other audio interface—not shown) and printers.

Personal computer 120 may operate in a networked environment using logical connections to one or more remote computers, such as a remote computer 149. Remote computer 149 may be another personal computer, a server (which is typically generally configured much like personal computer 120), a router, a network personal computer, a peer device, a satellite, or another common network node, and typically includes many or all of the elements described above in connection with personal computer 120, although only an external memory storage device 150 has been illustrated in FIG. 11. The logical connections depicted in FIG. 11 include a local area network (LAN) 151 and a wide area network (WAN) 152. Such networking environments are common in offices, enterprise-wide computer networks, intranets, and the Internet.

When used in a LAN networking environment, personal computer 120 is connected to LAN 151 through a network interface or adapter 153. When used in a WAN networking environment, personal computer 120 typically includes a modem 154 or other means for establishing communications over WAN 152, such as the Internet. Modem 154, which may be internal or external, is connected to system bus 123, or coupled to the bus via I/O device interface 146, i.e., through a serial port. In a networked environment, program modules depicted relative to personal computer 120, or portions thereof, may be stored in the remote memory storage device. It will be appreciated that the network connections shown are exemplary and other means of establishing a communications link between the computers may be used, such as wireless communication and wide band network links.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for simulating a real-time rendering of a desired graphical effect in an image of an object constituting a portion of a displayed scene on a display, in regard to a single static viewpoint, comprising the steps of:
    (a) precomputing data defining a behavior of light rays illuminating the object in regard to the single static viewpoint, based on a plurality of input images, to produce a plurality of morph maps for the object in which at least one set of pixel-dependent data is associated with each pixel position on the display;
    (b) in response to one of a user action and an event that indicates the desired graphical effect, performing a transformation two-dimensionally using the plurality of morph maps to produce an output image that simulates the real-time rendering of the desired graphical effect in the image of the object; and
    (c) displaying the output image.

2. The method of claim 1, wherein the step of precomputing comprises the step of producing data that include a blending factor.

3. The method of claim 1, wherein the step of precomputing comprises the step of producing data that include an additive factor that is used to control saturation of the output image.

4. The method of claim 1, wherein the step of precomputing comprises the step of tracing rays of light to determine the plurality of morph maps based on a global illumination and a local illumination at each intersection of the rays of light with a surface.

5. The method of claim 1, wherein the step of performing the transformation comprises the steps of:
    (a) producing a plurality of warped images from the plurality of morph maps; and
    (b) combining the plurality of warped images over a range, with a cross-dissolve, to produce successive output images in which the object morphs between an initial state and a final state.

6. The method of claim 1, wherein the step of performing the transformation comprises the step of mapping a selected portion of a surface of the object onto a different part of the object to simulate an effect corresponding to movement of the selected portion of the surface over the object.

7. The method of claim 6, wherein only pixels of the object that have been altered during the transformation to implement the effect are recomputed in the output image.

8. The method of claim 6, wherein the step of performing the transformation comprises the steps of:
    (a) providing a grid of cells that overlies and bounds pixels in the selected portion of the surface of the object in the output image;
    (b) for each cell of the grid, associating an arbitrary rectangle having an area that bounds all samples in an original image affected by the pixels in the cell of the output image; and
    (c) determining a union of all rectangles that are associated with the cells of the grid that intersect the area of the arbitrary rectangle, to produce the output image.

9. The method of claim 8, further comprising the step of using an index to map between a region in an input image and a corresponding region in the output image, to determine which portion of one of the input image and the output image is changed if a portion of the other of the input image and the output image has changed.

10. The method of claim 1, wherein the transformation to achieve the desired effect comprises one of the steps of:
    (a) mapping a texture onto the object in the output image;
    (b) applying a reflection to the object in the output image; and
    (c) applying a refraction of the object in the output image.

11. The method of claim 1, wherein the step of precomputing includes the step of storing anti-aliasing data for use in producing the output image.

12. The method of claim 1, wherein the step of precomputing is based on one of a three-dimensional geometry of the input images and a set of properties of a material in the input images.

13. The method of claim 1, wherein the data produced in the step of precomputing includes a lookup table in which parameters used in producing the output image are stored.

14. A computer-readable medium having computer-executable instructions for performing the steps recited in claim 1.

15. A computer-readable medium having computer-executable instructions for performing steps (b) and (c) in claim 1.

16. A method for simulating rendering of graphical effects in an image displayed in real time, comprising the steps of:
    (a) precomputing a plurality of morph maps of a displayed scene in regard to a single static viewpoint, said plurality of morph maps being blendable and including anti-aliasing information and data for each of a plurality of pixels in a defined area constituting a portion of the displayed scene;
    (b) storing the morph maps for subsequent use in simulating rendering of a selected effect associated with the defined area;
    (c) transforming at least one input image two-dimensionally using a blending of the plurality of morph maps to produce the selected effect in an output image; and
    (d) displaying the output image, simulating the real-time rendering of the selected effect in the defined area constituting the portion of the displayed scene in the output image.

17. The method of claim 16, wherein the selected effect comprises at least one of the steps of:
    (a) anti-aliasing to smooth edges in the output image;
    (b) displaying light refraction in the output image;
    (c) displaying light reflection in the output image;
    (d) morphing between an object in the displayed scene and a substantially altered object in a final output image over a defined range of intermediate images, starting with the input image; and
    (e) dynamically warping a selected portion of an object over a different portion of an object in the output image.

18. The method of claim 16, wherein for each pixel in the defined area, the data comprising each of the plurality of morph maps includes at least a subset of the following parameters:
    (a) an index that identifies a pixel data set from among a plurality of pixel data sets in the morph map;
    (b) an image identifier that, as a function of its value, indicates one of:
        (i) the input image from among a plurality of input images, in which the defined area appears; and
        (ii) a constant color that is to be applied to the pixel;
    (c) coordinates of the pixel in the input image;
    (d) the constant color that is to be applied to the pixel, dependent upon the value of the image identifier;
    (e) a multiplicative component applied to modulate an appearance of the pixel;
    (f) an additive factor used to shift the appearance of the pixel with a color saturation; and
    (g) a blending factor applicable to the additive factor.

19. The method of claim 16, wherein the step of precomputing comprises the step of computing the plurality of morph maps with a light simulating algorithm that determines a local illumination and a global illumination at each point where a light ray intersects a surface in the input image.

20. The method of claim 16, wherein the effect comprises the rendering of a textured patch on a surface of an object as the patch is dragged over the surface by a user, further comprising the step of indexing pixels on the input image to corresponding pixels in the output image in which the patch is illustrated as it is dragged.

21. The method of claim 16, wherein the effect comprises the rendering of an object simulating a refraction that occurs as light reflected from the object passes through a non-homogeneous medium that is at least partially transparent.

22. The method of claim 16, wherein only pixels in the input image that have changed are transformed to produce the output image.

23. The method of claim 22, further comprising the step of bi-directionally mapping between each of a plurality of pixels in a selected region of the input image and a corresponding pixel in a corresponding region of the output image, to define the pixels that have changed in the input image when producing the output image.

24. A system for simulating a real-time rendering of a desired graphical effect in an image of an object constituting a portion of a displayed scene on a display in regard to a specific viewpoint that remains static, comprising:
    (a) a display on which images are displayable;
    (b) a memory in which a plurality of machine instructions are stored; and
    (c) a processor coupled to the display and to the memory, said processor executing the plurality of machine instructions to carry out a plurality of functions, including:
        (i) precomputing data defining a behavior of light rays illuminating the object based on a plurality of input images, producing a plurality of morph maps in which at least one set of pixel-dependent data is associated with each pixel position, said data including anti-aliasing information, said plurality of morph maps being stored in the memory;
        (ii) in response to one of a user action and an event that indicates the desired graphical effect, performing a transformation two-dimensionally using the plurality of morph maps to produce an output image that simulates the real-time rendering of the desired graphical effect in the image of the object; and (iii) displaying the output image on the display.

25. The system of claim 24, wherein the data produced by precomputing include a blending factor.

26. The system of claim 24, wherein the data produced by precomputing include an additive factor that is used to control a color saturation in the output image.

27. The system of claim 24, wherein when precomputing, the processor traces rays of light to determine the plurality of morph maps based on a global illumination and a local illumination at each intersection of the rays of light with a surface in at least one of the input images.

28. The system of claim 24, wherein when performing the transformation, the processor:

(a) produces a plurality of warped images from the plurality of morph maps; and (b) combines the plurality of warped images with a cross-dissolve over a range to produce successive output images in which the object morphs between an initial state and a final state.

29. The system of claim 24, wherein when performing the transformation, the processor maps a selected portion of a surface of the object onto a different part of the object to simulate an effect corresponding to movement of the selected portion of the surface over the object.

30. The system of claim 29, wherein only pixels of the object that have been altered are recomputed by the processor in the output image.

31. The system of claim 29, wherein when performing the transformation, the processor:

(a) provides a grid of cells that overlies and bounds pixels in the selected portion of the surface of the object in the output image;

(b) for each cell of the grid, associates an arbitrary rectangle having an area that bounds all samples in an original image affected by the pixels in the cell of the output image; and (c) determines a union of all rectangles that are associated with the cells of the grid that intersect the area of the arbitrary rectangle, to produce the output image.

32. The system of claim 31, wherein execution of the machine instructions causes the processor to produce an index to map between a region in an input image and a corresponding region in the output image, said index being used by the processor to determine which portion of one of the input image and the output image should be changed if a portion of the other of the input image and output image has changed.

33. The system of claim 24, wherein the transformation to achieve the desired effect comprises one of:

(a) mapping a texture onto the object in the output image;

(b) applying a reflection to the object in the output image; and (c) applying a refraction of the object in the output image.

34. The system of claim 24, wherein when precomputing, the processor stores anti-aliasing data in the memory for use in producing the output image.

35. The system of claim 24, wherein the precomputing employs at least one of a three-dimensional geometry of the input images, and a set of properties of a material in the input images.

36. The system of claim 24, wherein the data produced when precomputing includes a lookup table in which parameters used in producing the output image are stored in the memory.

* * * * *